May 17, 1927.
R. E. HERSEY
1,628,978
AUTOMATIC REGULATOR FOR ENERGY TRANSFORMERS
Filed Aug. 6, 1923
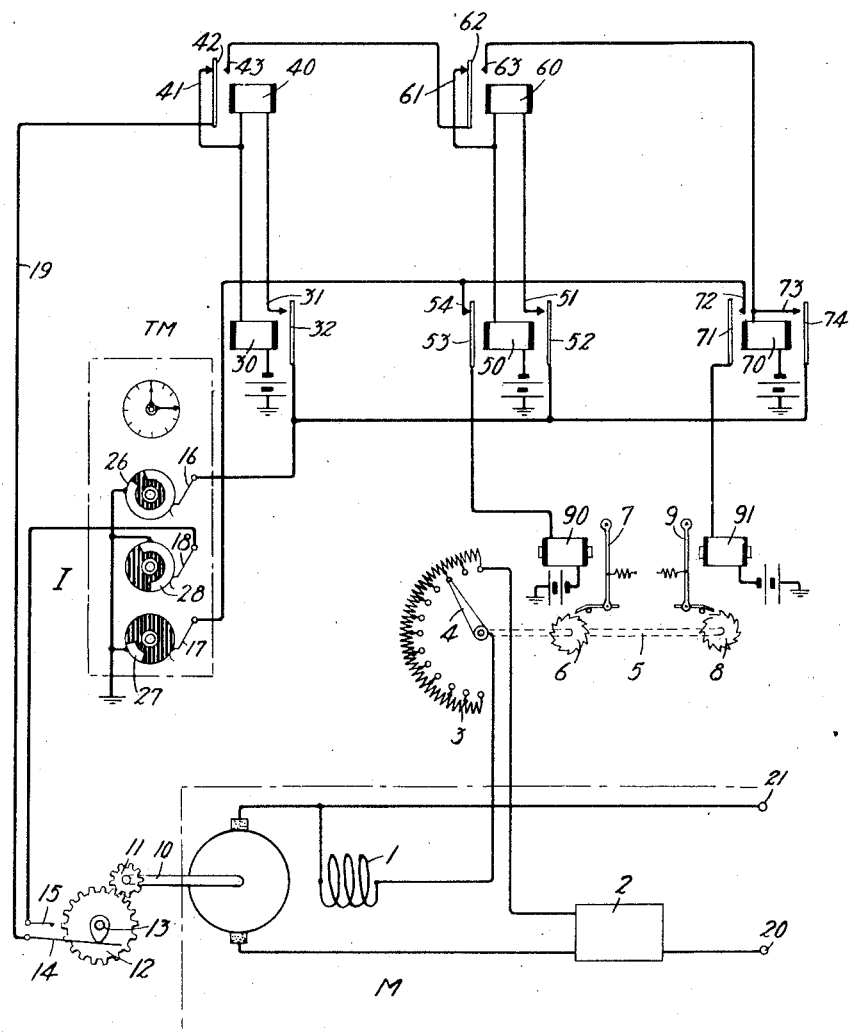
Inventor:
Ralph E. Hersey.
by E. W. Adams
Atty.

Patented May 17, 1927.

1,628,978

UNITED STATES PATENT OFFICE.

RALPH E. HERSEY, OF BROOKLYN, NEW YORK, ASSIGNOR TO WESTERN ELECTRIC COMPANY, INCORPORATED, OF NEW YORK, N. Y., A CORPORATION OF NEW YORK.

AUTOMATIC REGULATOR FOR ENERGY TRANSFORMERS.

Application filed August 6, 1923. Serial No. 655,803.

The object of this invention is to provide a method of and means for automatically regulating the amount of an energy-containing medium supplied to an energy-transformer to regulate the rate of transformation of the energy contained in the energy-containing medium, and more particularly, to automatically regulate the amount of energy-containing medium supplied to an energy-transformer capable of producing motion in order to regulate the speed of the transformer.

The invention contemplates a method of accomplishing the above object by regulating the amount of an energy-containing medium supplied to an energy-transformer under the joint control of a time controlled element and the energy-transformer.

The means for carrying out the method consists of an automatic device electromagnetically controlled for varying the amount of the energy-containing medium supplied to an energy-transformer under the direction of a means for indicating a predetermined constant unit on the one hand and any fraction of the constant unit produced by the transformer itself on the other hand, thereby automatically increasing or decreasing the rate of energy transformation effected by the transformer.

One application of my invention consists of a regulator for varying the amount of an energy-containing medium supplied to a motion-producing energy-transformer under the direction of a time controlled element and the transformer itself thereby automatically increasing or decreasing the rate of change of motion of the transformer.

In the present embodiment the invention is applied as a speed regulator for an electric motor to control the resistance in series with the field of said motor. This resistance is variable under control of electromagnetic apparatus and associated circuits, which circuits are themselves controlled by a time movement and a device governed by the movement of the motor itself.

The single figure of the drawing illustrates the invention in diagrammatic form.

In the drawing, M represents an electric motor, with its field coil 1, and starting box 2, connected at 20 and 21 to some source of electrical power supply. The resistance of the resistance coil 3 varies, depending upon the position of the movable member 4 which is in turn controlled by the movable rod 5 under the control of the ratchets 6 and 8 and the pawls 7 and 9. Coupled to the shaft 10 of the motor M is a toothed gear 11 controlling the gear 12 carrying the eccentric cam 13. The interrupter contact springs 14 and 15 will be in contact or separated depending upon the position of the eccentric cam 13. The time movement TM is supplied with an interrupter 1, which may consist of a slowly rotating drum or any other suitable device for making and breaking an electrical circuit at the proper interval of time. The interrupter 1 is supplied with three brushes or contact springs 16, 17 and 18, which are grounded by contact with the segments 26, 27 and 28 respectively for different fractions of a period of time, which period may be seconds, minutes, or hours as desired. The relative time of the opening and closing of these various brushes is graphically represented by the relative lengths of the segments 26, 27, and 28. The opening and closing of the contact springs 14 and 15, and the brushes 16, 17 and 18, control certain electrical circuits hereinafter more fully described. In the drawing the interrupter 1, may be assumed for purposes of illustration to be a rotary type rotating from right to left.

Assuming the motor M has been started by closing the circuits controlled by the starting box 2 in the manner well known in the art, shaft 10 will rotate in unison with the armature of the motor M and the toothed gear 11 rotating in unison therewith, will cause gear 12 likewise to rotate and separate the contact springs 14 and 15, once during each revolution of the cam 13. With the interrupter I of the time movement TM functioning, as soon as brush 18 makes contact with the segment 28, and the contacts 14 and 15 are closed a circuit to operate relay 30 will be closed as follows: battery, relay 30, 41, 42, 19, 14, 15, 18, 28, to ground. Relay 30 operated locks to ground as follows: battery, relay 30, 40, 31, 32, 16, 26 to ground. Relay 40 will not operate at this time, as it is short circuited by the circuit to ground at contact springs 14 and 15, 18, and 28. When the eccentric cam 13 separates contact springs 15 and 14, relay 40 operates and locks in series with relay 30 over the locking circuit previously described under control of brush 16 and segment 26 of interrupter I. Relay 40 operated; connects lead 19 to relay 50 by way of contacts 42, 43, 62 and 61. When lead 19 is again connected to ground by the closing of the contact springs 15 and 14, relay 50 operates and locks, and when contact springs 15 and 14 are separated, relay 60 operates and locks to ground under the control of brush 16 and segment 26 of interrupter I. Relay 50 operated, disconnects at 53 and 54, magnet 90 from the interrupter I of the time movement TM, thus preventing magnet 90 from operating when the brush 17 and segment 27 are closed during this cycle of operations, and connects lead 19 to relay 70 by way of 62 and 63. Relay 70 operates when the contacts 14 and 15 are again closed, and locks under control of brush 16 and segment 26 of interrupter I. With relay 70 operated, magnet 91 is operated when brush 17 of interrupter I makes contact with segment 27, over an obvious circuit, thus energizing the pawl 9 which engages with a tooth of the ratchet wheel 8, thus rotating the rod 5 and arm 4 one step in a clockwise direction, decreasing the amount of resistance 3 in circuit with the motor field 1, thus reducing the speed of the motor M. When relay 70 operates and locks to ground under control of brush 16, the impulsing circuit by way of the interrupter spring contacts 14 and 15 is rendered ineffective during the remainder of the cycle of operations. The brush 17 makes contact with segment 27 for a sufficient length of time to allow the magnet 91 to operate, and after brush 17 breaks contact with segment 27, brush 16 breaks contact with segment 26, opening the holding circuits and restoring the relays 30, 40, 50, 60 and 70, to normal. Magnet 91 was released, when the circuit to ground at brush 17 was opened, releasing the pawl 9, but the rod 5 and arm 4 remain stationary. The cycle of revolutions is now repeated. Assuming, however, that during the next cycle of operations the brush 17 and segment 27 of the interrupter I are closed before relay 50 operates, magnet 90 will operate over an obvious circuit under control of brush 17. Magnet 90 operated, engages the pawl 7 with one of the teeth of the ratchet 6 causing the rod 5 and arm 4 to rotate one step in a counter clockwise direction, thus increasing the amount of the resistance 3 in series with the field 1 of the motor M, thus increasing the speed of the motor. Brush 17 and segment 27 will be closed long enough to insure that magnet 90 has fully operated. After the brush 17 and segment 27 of the interrupter I are opened, holding ground will be removed from the relays 30, 40, 50, 60 and 70 by the breaking of the circuit between the brush 16 and segment 26, causing these relays to release, thus restoring the circuit to normal.

These cycles of operations will continue from time to time, thus maintaining motor M at a substantially uniform speed.

It is obvious that whenever the brush 16 breaks contact with segment 26 after the relay 50 operates and before relay 70 operates the circuit will be restored to normal without varying the resistance 3 in series with the field 1. This is the ideal sought for, because when such a condition exists it indicates that the motor M is revolving at the desired speed.

It is obvious that as many pairs of relays may be inserted between relays 30, 40, and 50, 60 as is required to give the proper period of counting, and that the greater the number of pairs of relays inserted between 50, 60 and relay 70, the greater will be the limits in speed variation allowed by the regulator.

It is evident that the smaller the change in resistance of the resistance coil 3 effected by the movement of the armature 4, the finer will be the motor speed adjustment obtainable. It is also obvious that the relative period of circuit closure of the three brushes 16, 17 and 18 of the interrupter I, may be varied to meet any desired condition and that the number of pairs of relays in the chain may also be varied as required. By varying any of these elements as conditions may require any desired speed regulation within any desired limits can be obtained.

While for purposes of illustration the invention has been shown applied to an electrically driven motor, it is not so limited but may be applied to any movable member supplied with energy from another source for furnishing motive power, where the influx of the medium containing the energy is capable of regulation by furnishing a suitable regulator.

The invention may also be applied to any device capable of transforming energy from one form to another, where the rate of energy production is capable of being compared with some predetermined unit of like character, and the rate of supply of the medium containing the energy is itself capable of regulation by a suitable automatically controlled device.

What is claimed is:

1. A regulator for an energy-transformer comprising means for indicating any desired unit of time, an interrupter operated at the expiration of each time unit controlled thereby, another interrupter controlled by said transformer, a train of relays controlled by said second mentioned interrupter, and a circuit controlled by the conjoint action of the interrupters and the train of relays for varying the amount of energy supplied to the transformer.

2. A regulator for an energy-transformer capable of producing motion comprising a time controlled element, an interrupter controlled by said transformer, a group of relays arranged in pairs, and a circuit controlled by the conjoint action of the interrupter, the time controlled element, and the group of relays, for varying the amount of energy supplied to the transformer.

3. A regulator for an energy-transformer capable of producing a rotary form of motion comprising a time controlled element, a circuit interrupter controlled by said transformer, a group of relays controlled by said interrupter, and a circuit controlled by the conjoint action of the circuit interrupter, the time controlled element, and the group of relays for varying the amount of energy supplied to the transformer.

4. A regulator for an electric current motor comprising an interrupter controlled by said motor, a time controlled element, a group of relays controlled by said interrupter, and a circuit controlled by the conjoint action of the interrupter, the time controlled element, and the group of relays for varying the amount of electric current supplied to the motor.

5. A regulator for an electric current motor comprising a time controlled element, a group of relays arranged in pairs, an interrupter controlled by said motor, a circuit including said interrupter and said pairs of relays arranged to operate one relay of the first pair when the circuit is closed, and the other relay of the first pair when the circuit is broken, thereby transferring the circuit to the next pair of relays and so on, electromagnetic means automatically controlled for varying the amount of electric current supplied to the motor, a circuit including said electromagnetic means controlled by the relays and the time controlled element, for varying in one direction the amount of electric current supplied to the motor, and a circuit including said electromagnetic means, controlled by said relays and the time controlled element for varying in the opposite direction the amount of electric current supplied to the motor.

6. A regulator for an electric motor comprising an interrupter controlled by said motor in revolving, a train of relays operated in succession under the control of said interrupter, a timing device for measuring off uniform intervals of time, an interrupter operated thereby at the expiration of each time interval to release said relay train, means for varying the speed of said motor, a circuit for controlling said means, and means jointly controlled by the timing device and the relay train for closing said speed controlling circuit.

7. A regulator for an electric motor comprising an interrupter controlled by said motor in revolving, a train of relays operated in succession under the control of said interrupter, a timing device for measuring off uniform intervals of time, an interrupter operated thereby at the expiration of each time interval to release said relay train, means for increasing the speed of said motor, a circuit for controlling the same, means for decreasing the speed of said motor, a circuit for controlling the same, and means jointly controlled by the timing device and the relay train for closing one or the other of said speed controlling circuits.

In witness whereof, I hereunto subscribe my name this 27 day of July A. D., 1923.

RALPH E. HERSEY.